OPTICAL CHANNEL SEPARATION BY DEFLECTION

Filed Aug. 27, 1965 Sheet 1 of 3

INVENTORS P. V. LENZO
E. G. SPENCER
BY Roy M. Porter Jr.
ATTORNEY

United States Patent Office 3,433,958
Patented Mar. 18, 1969

3,433,958

OPTICAL CHANNEL SEPARATION BY DEFLECTION

Pascal V. Lenzo, Warren Township, and Edward G. Spencer, Berkeley Heights, N.J., assignors to Bell Telephone Laboratories, Incorporated, New York, N.Y., a corporation of New York Filed Aug. 27, 1965, Ser. No. 483,201
U.S. Cl. 250—199 12 Claims
Int. Cl. H04b *9/00*; H01s *3/00*; G02b *27/10*

ABSTRACT OF THE DISCLOSURE

The principle of the Debye-Sears deflection is employed to separate a plurality of modulations on a plurality of microwave frequency subcarriers which are in turn modulated upon an optical beam. A plurality of elastic wave signals each having a frequency displaced by a small amount from the frequency of a corresponding one of said subcarriers are introduced into a diffraction medium. A plurality of optical detectors are located at points in the dispersed beam corresponding respectively to the several deflection angles produced by the respective elastic waves. Each detector has a limited bandwidth centered upon a frequency twice said small amount and detects intermodulation components containing only the modulation upon one of said microwave frequency subcarriers.

This invention relates to optical beam deflection systems and, more particularly, to deflection employed to separate optical channels on the basis of their high frequency modulation components.

With the advent of the optical maser and its highly coherent optical frequency beam, considerable attention has been given to the design of an optical communication system. Because of the extremely broad band of an optical beam, it is contemplated that a single beam would be modulated with several channels each having a bandwidth of several thousand megacycles comparable to the full band of a present microwave relay system. Each of the microwave frequency channels in effect becomes a subcarrier on the optical beam as each would in turn carry intelligence modulation comprising, for example several television channels or several hundred telephone channels or a combination of these and other communication signals.

It therefore becomes important to separate one or more of the microwave frequency subcarriers from others on the optical beam. Conceivably this could be done electronically after suitable detection of the full modulation on the beam, but the required bandwidths are beyond the present capability of both optical detectors as well as electronic microwave equipment.

It is therefore an object of the present invention to optically separate or drop channels of an optical beam on the basis of the modulation components thereon.

The diffraction grating is a known frequency sensitive mechanism in classical optics, and an acoustical diffraction grating of the type referred to as the Debye-Sears cell is an adjustable form thereof. The acoustical grating comprises a light transparent, homogeneous, piezoelectric medium which is disturbed by the passage of electrically excited elastic waves to produce a periodic variation of the index of refraction of the medium. Light directed through the medium is diffracted as a function of the ratio of the wavelength of the light to the wavelength of the elastic wave.

In accordance with the present invention, it has been recognized that when such a diffraction medium is excited by a standing elastic wave, two coincident optical beams are deflected at the same angle. All component frequencies in one beam have been shifted up in frequency by an amount equal to the frequency of the elastic wave and all component frequencies in the other have been shifted down by the same amount. The angle at which both beams exit from the medium is inversely proportional to the wavelength of that elastic wave producing the shift. Further, if the two deflected beams are then intermodulated with each other, one of the many intermodulation products will contain the original component frequencies now shifted to a frequency determined by the elastic wave frequency. This phenomenon is utilized in accordance with the present invention to separate from an optical beam modulated by a plurality of intelligence bearing microwave subcarriers, the intelligence upon a specific one or more of these subcarriers.

In the particular embodiment to be illustrated, the multichannel optical beam is intermodulated with a first elastic wave having a frequency spaced by a given difference from the frequency of a given one of said subcarriers. An optical detector responsive to a limited bandwidth of intensity variations centered upon a frequency twice said difference, is located at a point in said dispersed beam corresponding to the diffraction angle produced by the wavelength of said first elastic wave. Upon intermodulation in the detector, components corresponding only to the given one of said subcarriers are detected. Since the undeflected beam is unaffected by the first elastic wave, further elastic wave signals bearing similar frequency differences to other subcarriers are applied to the medium and components of these subcarriers are respectively detected by similar detectors located at the other points in the dispersed beam.

These and other objects, the nature of the present invention, its various features and advantages, will appear more fully upon consideration of the various illustrative embodiments now to be described in detail in connection with the accompanying drawings in which.

Figure 1:
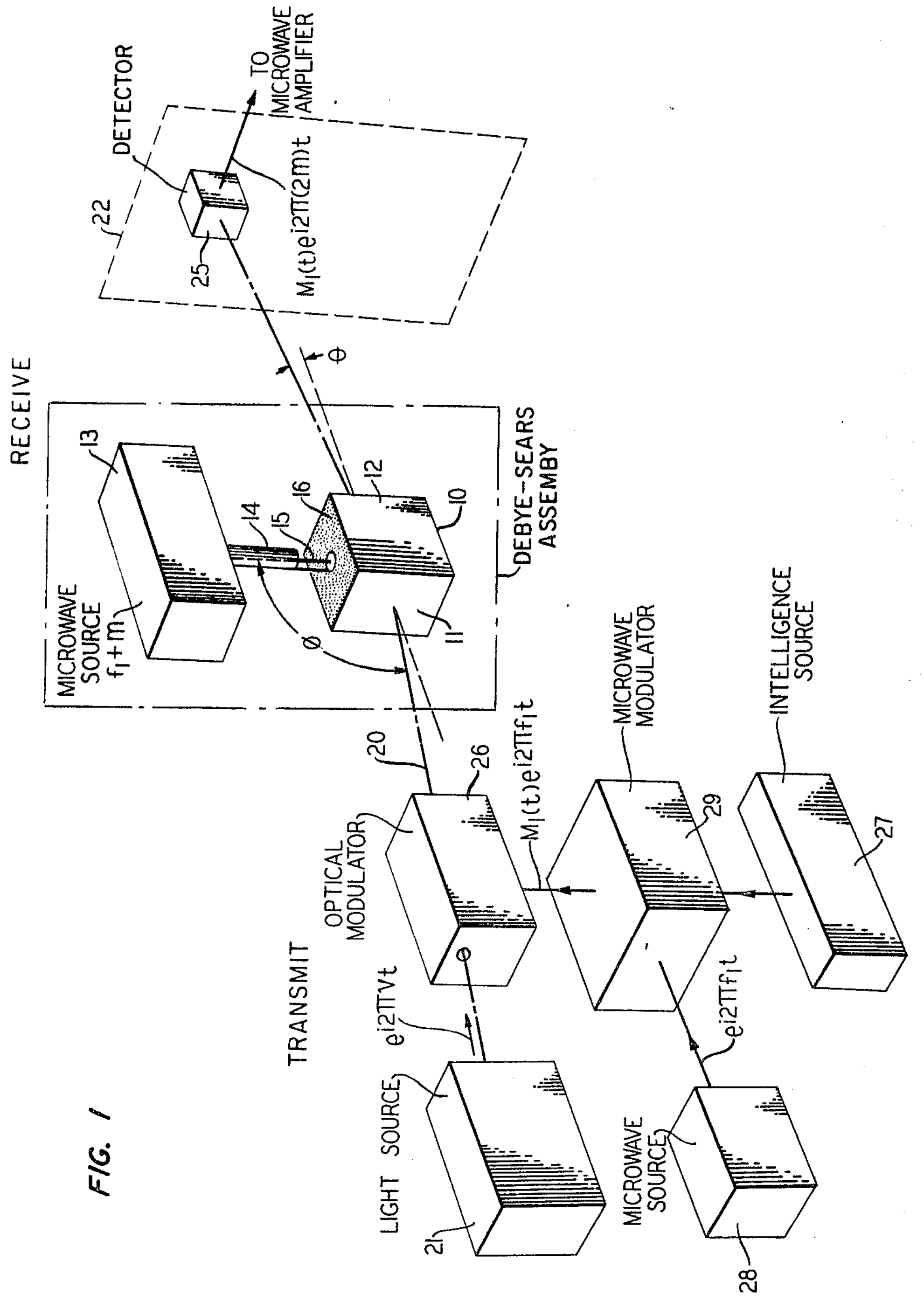
FIG. 1 is a perspective block diagram schematic of an optical communication system using beam deflection to drop a single channel.

Referring more particularly to FIG. 1, an illustrative embodiment of a light deflector employed in a channel separation and detection system is shown. The active medium of the deflector comprises a block 10 of material which has at frequencies in the microwave range a high piezoelectric constant, a high elasto-optic coupling coefficient and a low elastic wave transmission loss. Suitable materials include those previously known to be both piezoelectric and piezo-optic, such as quartz. In accordance with the invention disclosed and claimed in the copending application of the inventors hereof with another, Ser. No. 516,986 filed Dec. 28, 1965, a continuation-in-part of Ser. No. 483,259, filed on an even date herewith, now abandoned, a melt grown single domain crystal of lithium metaniobate is preferred at the microwave frequencies here contemplated. Opposing parallel faces 11 and 12 of block 10 are polished optically flat.

Suitable means are provided for generating a standing elastic wave at a microwave frequency $f_1+m$ within block 10, propagating in a direction therein parallel to faces 11 and 12. Any suitable elastic wave transducer bonded to the top face of block 10 may be used for this purpose. However, according to a preferred embodiment, the piezoelectric properties of block 10 are employed according to the principles disclosed by H. E. Bommel et al., in Patent 3,037,174, May 29, 1962. As there described, an electric field gradient at microwave frequencies is set up at the surface of block 10 such that the piezoelectric response of the material of block 10 generates an elastic wave propagating normally back and forth between the excited surface and the opposite surface and parallel to the polished surfaces 11 and 12. While microwave cavities are disclosed by Bommel and numerous other equivalents will occur to those skilled in the art, it is preferred for the purposes of the present invention, that the microwave energy be applied from source 13 by way of coaxial conductor 14 to a probe 15 contacting one point on the surface of block 10. The outer conductor of coaxial 14 is connected to a suitable conductive ground plane, spaced from and surrounding probe 15. This ground plane may be a conductive metallic coating 16 applied directly to block 10 or the ground plane may be the conductive body of a jig (not shown) which supports block 10. Non-piezoelectric, but highly elasto-optic materials such as rutile (titanium dioxide) may be used but then separate piezoelectric transducers are required to launch the elastic wave.

The optical system is schematically illustrated in FIG. 1 comprising a source 21 of a collimated light beam 20, such as an optical maser. Beam 20 is directed through one of the polished surfaces 11 at an angle of incidence $\varphi$ both to surface 11 and to the elastic wave path in body 10 and emerges through the other surface 12 to impinge upon object plane 22 deflected from the path of the incident beam by the angle $\theta$.

This deflection results from a form of the well-known Debye-Sears diffraction phenomenon, an analysis of which may be found in any standard optical textbook, for example, see Chapter XII, "Principles of Optics," Born & Wolf, 1964; or P. K. Tien, Patent 3,174,044, Mar. 16, 1965. Briefly, an elastic wave is generated piezoelectrically at probe 15 in body 10 by the electrical signal from source 13. Provided the elastic wave transmission losses of body 10 are small and its acoustical Q is high, the wave repeatedly travels transversely through the body. Provided further that the body has sufficient elasto-optic properties, the elastic wave sets up a moving periodic variation in the index of refraction of the medium. Finally, if the medium is sufficiently transparent to beam 20, the beam will be diffracted as a function of the ratio of the wavelength of the light and the elastic wave.

The present invention is concerned with the application of light deflection to detect the intelligence upon a particular microwave frequency subcarrier which in turn is modulated along with other microwave subcarriers upon the optical beam. Thus, the intelligence signal from source 27 is combined with the microwave subcarrier $f_1$ from source 28 in modulator 29, which may be an amplitude, phase or frequency modulator having an output defined as $M_1(t)e^{i2\pi f_1 t}$ where $M_1(t)$ is a time varying modulation factor. This signal is applied to frequency or intensity to modulte the optical beam of frequency $\nu$ from source 21 by means of modulator 26 to produce a modulated optical beam defined as $M_1(t)e^{i2\pi(\nu\pm f_1)t}$.

Modulator 26 may take any one of several forms known in the art. For example, it may be of the general type in which one or more electro-optically active substances are interposed in the beam as disclosed in I. P. Kaminow et al., Patent 3,133,198, May 12, 1964; or may utilize a depletion layer in a semiconductive material as disclosed in a copending application of A. Ashkin et al., Ser. No. 265,511, filed Mar. 15, 1963 now Patent 3,295,911, Jan. 3, 1967; or may depend upon elastic wave diffraction as disclosed in P. K. Tien Patent 3,174,044, Mar. 16, 1965. Alternatively the light generating function of source 21 may be combined with the modulating function in a structure of the type disclosed in the copending application of I. P. Kaminow, Ser. No. 379,273, filed June 30, 1964.

Located in object plane 22 at a point therein displaced from the axis of beam 20 by the angle $\theta$, is at least one optical detector, such as 25, which is capable of mixing at least two optical beams of different frequencies and producing an electrical output corresponding to a beat frequency between them at an intermediate frequency $2m$ below the microwave range. Furthermore, either the detector itself or the electrical circuit connected in its output should have a bandwidth restricted to the bandwidth of the intended intelligence signal. In other words, detector 25 responds to the envelopes of the optical signals and detects a modulated difference signal at a frequency equal to twice the difference between the modulating microwave signal $f_1$ and the elastic wave frequency $f_1+m$.

For example, detector 25 may be a semiconductor photodiode comprising a PN or PIN junction structure or a bulk photoconductor such as a crystal of cadmium selenide with ohmic contacts affixed to its edges Full descriptions of each type and comparisons between them may be found in the literature. See, for example, the survey article, "Solid State Photodetection: A Comparison Between Photodiodes and Photoconductors," by Di Domenico & Sevelto, 52 Proceedings of the IEEE 136, Feb. 1964 and the bibliography therein. For the purposes of the present invention, the bulk photoconductor appears preferably only insofar as its large area eliminates the need for optical focusing.

Illustrative of the orders of magnitude of the several component frequencies, it is contemplated that in a particular embodiment the optical signal would have a frequency $\nu$ in the order of $3\times10^{14}$ megacycles per second, the microwave carrier signal $f_1$ would have any value from about 100 megacycles ($10^8$) to several kilomegacycles ($10^{10}$), while the frequency $m$ would be in the order of 30 megacycles ($3\times10^7$) thus providing an intermediate frequency of 60 megacycles.

Operation in accordance with the present invention may be understood by recalling as disclosed in the above-mentioned patent of P. K. Tien that a diffraction grating of the type described produces a first order diffraction lobe defined by the Bragg relationship $$\cos\varphi=\frac{\lambda_\nu}{2\lambda_{(f_1+m)}} \qquad (1)$$

where $\varphi$ is that angle measured from the plane of the grating to the propagation path for which the path difference between rays from a plurality of successive points in the wave front of equal phase will be an integral multiple of wavelengths, $\lambda_\nu$ is the wavelength of the light frequency $\nu$, and $\lambda_{(f_1+m)}$ is the grating spacing equivalent to the elastic wavelength at the frequency $f_1+m$. More convenient for present purposes than the angle $\varphi$ defined above, is the angle between the diffracted first order lobe and the portion of the main beam which continues along the original path. Designating this angle $\theta$ as shown on FIG. 1, simple geometry will indicate that $$\sin\frac{\theta}{2}=\cos\varphi=\frac{\lambda_\nu}{2\lambda_{(f_1+m)}} \qquad (1a)$$

All reference hereinafter and in the appended claims to "diffraction angle" refers to the angle $\theta$ and will be understood to mean that angle at which the diffracted energy leaves the main beam. From a practical standpoint the quantity $\lambda_\nu$ may be considered constant regardless of its modulation since the change in the light wavelength caused by the modulation thereof is insignificant.

At the same time, however, reflection from the moving interfaces between high and low density layers caused by the elastic wave have produced a Doppler shift in the frequency of the deflected optical beam equal to the frequency of the elastic wave. Since the interfaces caused by a standing wave move in both directions, the emerging beam is in effect two beams, one having components shifted up and the other having components shifted down, and includes among others the frequencies $$\nu+(f_1+m)$$

and (2)

$$\nu-(f_1+m)$$

both of which appear in the dispersed beam at the diffraction angle $\theta$. Detector 25 intermodulates the beams, produces and detects cross modulation products including that difference product which is a frequency $2m$ together with the intelligence modulation $M_1(t)$ thereon. The frequency selectivity of detector 25 and the electronic circuit connected thereto excludes all other modulation products.

Figure 2:
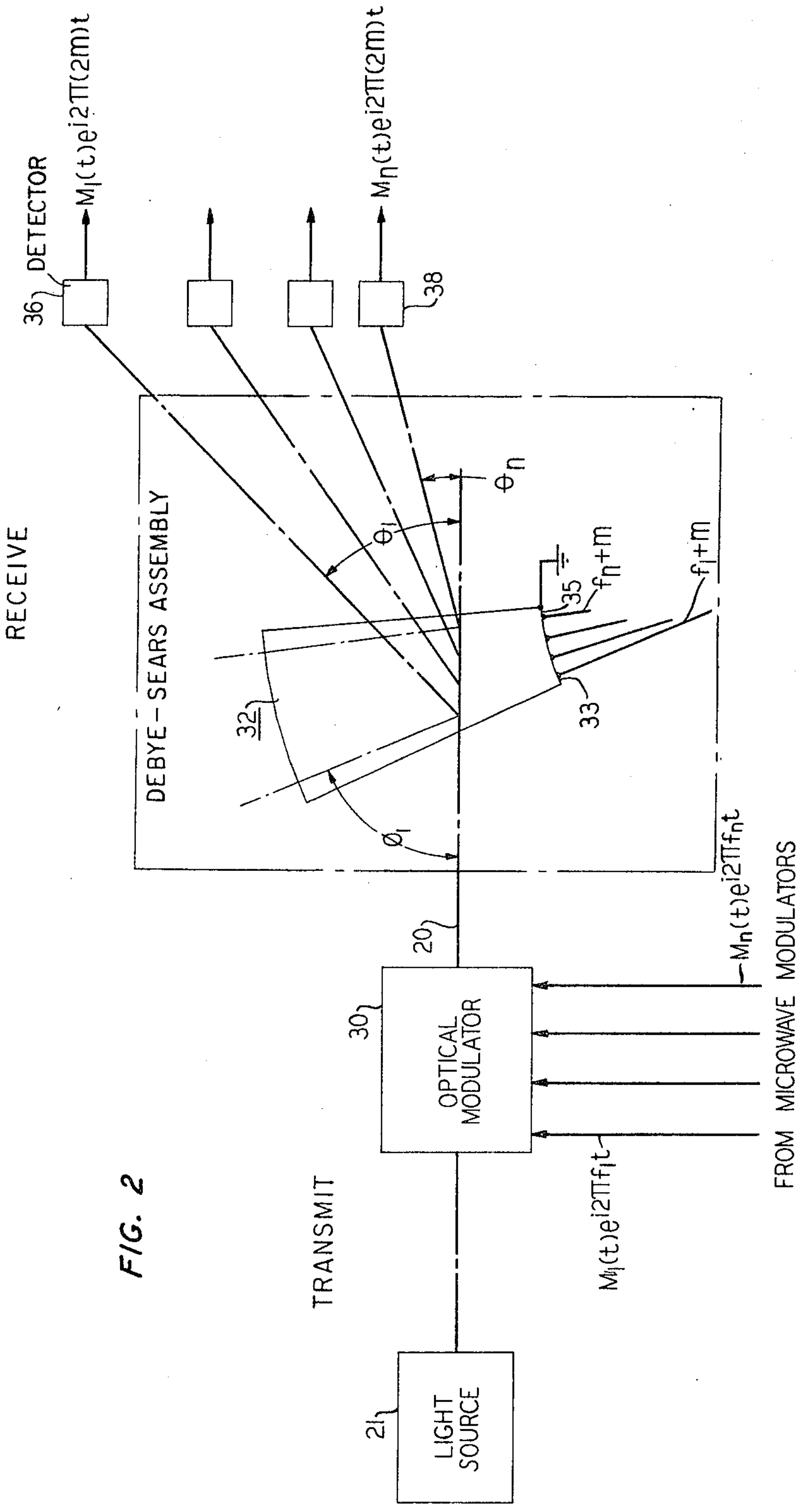
FIG. 2 is an application of the principles of FIG. 1 to a system for dropping a plurality of channels.

In FIG. 2 the principles of the invention are applied to a multichannel system in which a plurality of microwave subcarriers $f_1 \ldots f_n$ are modulated, respectively, by intelligence signals represented by the time varying modulation factors $M_1(t) \ldots M_n(t)$, and are impressed upon optical beam from source 21 by means of modulator 30. The modulated beam 20 is directed through piezo-optic member 32 which are generally similar to block 10 of FIG. 1 except for the modification further illustrated in FIG. 3. These modifications include provision for exciting at different facets 33 to 35 on a surface of member 32 a plurality of electric fields, each being related by a fixed difference $m$ to one of the microwave subcarriers. The exciting signals and the elastic waves respectively produced thereby are designated $f_1+m \ldots f_n+m$. In the diffraction pattern of beam 20 are a plurality of like frequency selective optical detectors 36 through 38 located, respectively, at angles $\theta_1$ to $\theta_n$ from the original beam path. Each of these detectors may be identical to detector 25 of FIG. 1.

Figure 3:
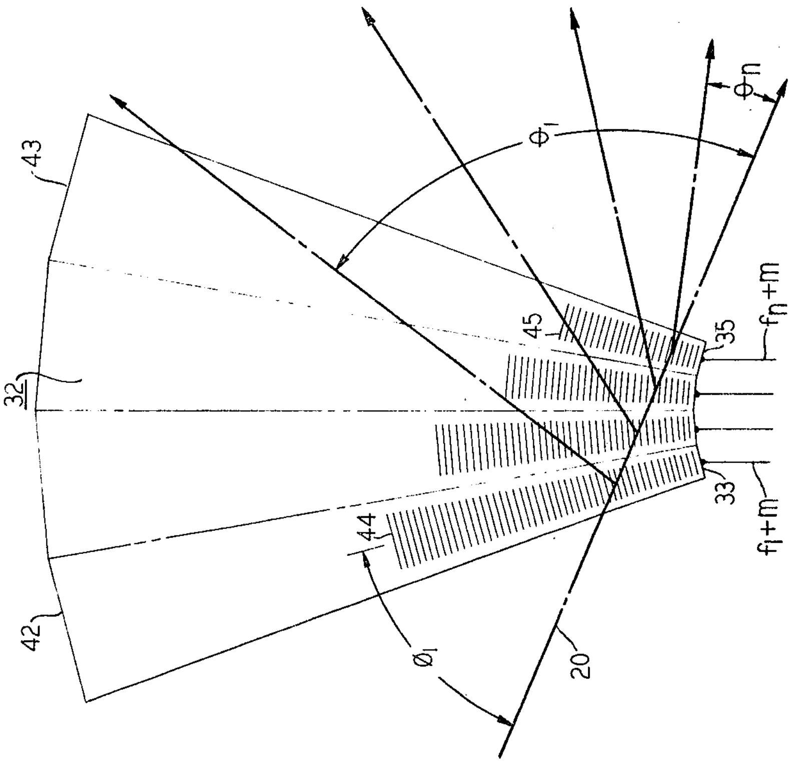
FIG. 3 is a detail showing of the deflecting body in FIG. 2.

As may be seen from FIG. 3, body 32 has a shape which can be characterized as a plurality of slightly different adjacent prisms each having right trapezoidal cross-sections formed either integrally or from assembled segments. The several elastic wave signals $f_1+m$ through $f_n+m$ are launched from facets 33 and 35, respectively, each comprising the base of one trapezoid, to propagate back and forth between the respectively opposite bases 4 2and 43 as schematically represented by the paths 44 and 45. The angular relationship between the planes of facets 33 and 35 as well as the intermediate facets is such that the angles $\varphi_1$ through $\varphi_n$, formed respectively between each elastic wave propagating along a path normal to a facet and beam 20, have the unique values as required for each by Equation 1.

It should be apparent that the required angle between the incident beam and each elastic wave path may be met by many structures which are equivalent to the particular one illustrated. For the purposes of present illustration the small refraction angles produced in each ray upon entering and leaving body 32 are neglected. Since these angles depend upon the external contour of body 32, they may be eliminated altogether by a design of this contour such that each ray enters or leaves normally to the body surface.

Thus each electrical field $f_1+m$ to $f_n+m$ sets up an acoustic wave in body 32 at its own frequency, traveling at its own angle $\varphi$ to the incident beam. Each wave acts as a diffraction grating, shifts the frequency of every component in the optical beam up and down as described hereinbefore and deflects the shifted energy from the main beam by one of the angles $\theta_1$ to $\theta_n$ according to Equation 1*a* so that each deflected portion is directed toward one of the detectors 36 through 38.

It will now be demonstrated that each detector produces an output which represents the intelligence signal upon only one microwave subcarrier channel without interaction or crosstalk between channels. This surprising and valuable result may be seen by considering the nature of an optical beam of frequency $\nu$ modulated by two microwave subcarrier channels each bearing different intelligence. To simplify the equations, immaterial amplitude coefficients have been omitted from all terms. Thus the modulated beam may be defined as:

$$M_1(t)e^{i2\pi(\nu\pm f_1)t}+M_n(t)e^{i2\pi(\nu\pm f_n)t} \quad (3)$$

where $M_1(t)e^{i2\pi f_1 t}$ is a first microwave subcarrier of frequency $f_1$ having an intelligence modulation factor $M_1(t)$; $M_n(t)e^{i2\pi f_n t}$ is a second microwave subcarrier of frequency $f_n$ having an intelligence modulation factor $M_n(t)$.

Interaction with standing wave grating of the frequency $f_1+m$ deflects a certain percentage of the incident beam with frequency components derived from both microwave subcarriers as:

$$M_1(t)e^{i2\pi[\nu\pm f_1\pm(f_1+m)]t}$$

and (4)

$$M_n(t)e^{i2\pi[\nu\pm f_n\pm(f_1+m)]t}$$

all directed substantially at angle $\theta_1$ as derived from Equation 1*a* where:

$$\frac{\theta_1}{2}=\sin^{-1}\frac{\lambda_\nu}{2\lambda_{(f_1+m)}} \quad (5)$$

This composite beam contains the following eight frequencies:

$\nu+2f_1+m$
$\nu+(f_1+f_n)+m$
$\nu-2f_1-m$
$\nu-(f_1+f_n)-m$
$\nu+m$
$\nu-(f_1-f_n)-m$
$\nu-m$
$\nu+(f_1-f_n)+m$

The frequencies containing the term $f_n$ carry intelligence modulation factor $M_n(t)$; the frequencies without the term $f_n$ carry $M_1(t)$. In detector 36 placed in the path of the beam, all pairs of the above eight frequencies are intermodulated. Excluding those products that are in the optical range, the following components appear in the output of detector 36:

$$(1) \quad M_1(t)e^{i2\pi(2m)t}$$
$$(2) \quad [M_1(t)M_n(t)]^{1/2}e^{i2\pi(f_1-f_n+2m)t} \quad (7)$$
$$(3) \quad [M_1(t)M_n(t)]^{1/2}e^{i2\pi(f_1-f_n)t}$$

in addition to components of microwave frequency. Provided that detector 36 together with its output circuit has, as is set forth above, a restricted bandwidth responsive to the frequency $2m$ and provided $f_1-f_n$ is different from $2m$ by at least one half the bandwidth of the output circuit, only component (1) of Equation 7 will be detected. This component contains the intelligence signal $M_1(t)$ on channel $f_1$ separated from the intelligence signal $M_n(t)$ on the other channels. The undeflected portion of the original beam is unaffected by the first encountered grating and passes on through succeeding gratings where successive deflection of portions of its energy occur. Thus only at the angle $$\frac{\theta_n}{2}=\sin^{-1}\frac{\lambda_\nu}{2\lambda_{(f_n+m)}} \quad (8)$$

will the subcarrier components be detected of the frequency $2m$ that have the intelligence $M_n(t)$ thereon. Thus the intelligence modulation associated with each of the several subcarriers have been separated by the combined spatial and frequency selectivity of detectors 36–38 and may be further processed by electronic apparatus at the frequency $2m$.

Figure 4:
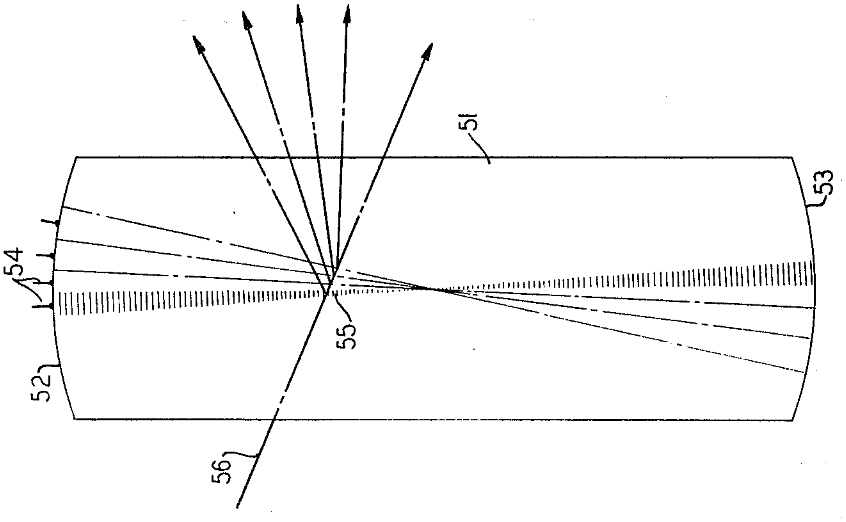
FIG. 4 is a detail showing of an alternative shape for the deflecting body in FIG. 2.

In FIG. 4 an alternative shape for body 32 of FIG. 2 is illustrated comprising an elongated body 51, preferably of lithium niobate, the ends 52 and 53 of which are shaped as opposing coaxial cylindrical segments with a spacing between them of twice their radii. Since the side boundaries are not critical to the invention, body 41 may have a transverse cross-section that is rectangular or circular and alternatively it may comprise a full sphere having opposing flattened sides. Input electrodes such as 54 contact one spherical surface at spaced points along a given great circle thereof. The advantages of such a structure will be readily understood by noting that an elastic wave generated at the point of contact of one electrode 54 propagates normally away from surface 52 toward surface 53. Since the wave front will inherently undergo some spreading in body 51, surface 53 acts as a spherical reflector to refocus the energy upon the original points. Any desired angle between a given elastic wave propagation path such as 55 and the incident beam 56 may be determined and readily adjusted merely by positioning the point of contact of electrode 54 on surface 52.

While it is contemplated that one of the more useful applications of the principles of the invention involves an intermediate frequency $2m$ that is lower than any of the microwave subcarriers but greater than the intelligence modulation thereon, it should be understood that the principles are likewise applicable to a system in which $2m$ is a high microwave frequency as well as to one in which $m$ is zero. In the particular case where $m$ is zero it should be noted that all channels are reduced to baseband, that is, the output from detectors 36 through 38 comprises the intelligence modulation on each of the channels separated both from the optical carrier and from its microwave subcarrier. Furthermore, while it is preferred that detectors 36 through 38 detect their cross-modulation products at the same frequency $2m$ as described because this mode of operation provides the minimum of crosstalk between channels as has been demonstrated, it should be noted that signal outputs useful in some applications may also be obtained by detection at $m$, by detection at harmonic integers of $m$ and by detection at frequencies that are different in different ones of the detectors.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. Apparatus for detecting a band of modulation on an optical beam comprising less than the frequency band of the total modulation on said beam, said apparatus including means for shifting the frequency of two portions of the energy in said beam up and down respectively by a given amount and for deflecting said shifted portions from said beam by an angle which is a function of said given amount, and means for intermodulating said deflected portions with each other and for detecting modulation products of their difference.

2. Apparatus according to claim 1 wherein said means for shifting and deflecting comprises means for forming a periodic diffraction grating in the path of said beam at a frequency equal to said given amount.

3. Apparatus according to claim 1 wherein said means for shifting and deflecting comprises a member of elastic wave transmitting material interposed in the path of said beam and means for launching a standing elastic wave in said material at a frequency equal to said given amount.

4. Apparatus according to claim 1 wherein said means for intermodulating and detecting comprises a photosensitive device selected from the class including photodiodes and photoconductors located in the path of said deflected portion of said beam.

5. An optical communications system comprising, a source of a beam of energy of optical frequency that is modulated by a plurality of intelligence bearing signals of microwave frequency, means interposed in the path of said beam for forming a plurality of periodic diffraction gratings at a plurality of microwave frequencies displaced respectively in frequency from each of said intelligence bearing signals by an amount that is small compared to said optical frequency and small compared to the frequency of said intelligence bearing signals, and means at a plurality of points spaced traversely in the path of said beam after passing through said material for detecting modulation products from said optical beam at a frequency that is small compared to said optical frequency and small compared to the frequency of said intelligence bearing signals.

6. An optical communications system comprising, a source of radiant energy of optical frequency $\nu_\lambda$ and a wavelength $\lambda$, a source of intelligence bearing signals of microwave frequencies $f_1$ and $f_n$, means for modulating said optical energy with said microwave signals, means interposed in the path of said optical energy for forming a plurality of periodic diffraction gratings including ones formed at frequencies $f_1+f_n+m$ and having grating spacings $\lambda_{(f_1+m)}$ and $\lambda_{(f_n+m)}$ to produce angular dispersion of optical energy, means for deriving the intelligence represented by $f_1$ to the exclusion of intelligence represented by $f_n$ comprising means for detecting components of said dispersed energy that vary at the frequency $2m$ and that have an angle measured from the plane of said grating whose cosine is substantially $$\frac{\lambda_\nu}{2\lambda_{(f_1+m)}}$$

means for deriving the intelligence represented by $f_n$ to the exclusion of intelligence represented by $f_1$ comprising, means for detecting components of said dispersed energy that vary at the frequency $2m$ and that have an angle whose cosine is substantially $$\frac{\lambda_\nu}{2\lambda_{(f_n+m)}}$$

7. An optical communications system comprising, a source of radiant energy in the optical frequency range, a source of intelligence bearing energy in the microwave frequency range, means for modulating said optical energy by said microwave energy, and means for removing at least a part of said intelligence bearing microwave energy from said optical energy including a member of substantially transparent elastic wave transmitting material interposed in the path of said optical energy, means for launching an elastic wave in said material having a frequency in the microwave range displaced in frequency from the frequency of said part of said microwave energy, and means responsive to variations in said optical energy which has passed through said member at a frequency different from said microwave frequency and said optical frequency, said last named means being displaced from said path by an angle whose sine is a function of the wavelength of said optical energy to the wavelength of said elastic wave.

8. An optical communications system comprising, a source of radiant energy of optical frequency $\nu_\lambda$ and wavelength $\lambda_\nu$, a source of intelligence bearing signals of different microwave frequencies $f_1$ and $f_n$, means for modulating said optical energy with said microwave signals, means for deriving the intelligence represented by $f_1$ to the exclusion of intelligence represented by $f_n$ including a member of substantially transparent elastic wave transmitting material interposed in the path of said optical energy, means for launching an elastic wave of frequency $f_1+m$ in said material and having a wavelength therein $\lambda_{(f_1+m)}$ where $m$ is an amount that is small compared to $f_1$ to produce an angular dispersion of said energy, and means for detecting components of said dispersed energy that vary at a frequency $2m$ and that have a dispersion angle $\theta$ wherein $$\sin\frac{\theta}{2}=\frac{\lambda_\nu}{2\lambda_{(f_1+m)}}$$

9. An optical communications system comprising, a source of a beam of energy of optical frequency $\nu$ that is modulated by a plurality of intelligence bearing signals $f_1$ and $f_n$ of microwave frequency, a body of substantially transparent elastic wave transmitting material interposed in the path of said beam, means for launching in said body elastic waves $f_1+m$ and $f_n+m$ of microwave frequency where $m$ is an amount that is small compared to both said optical frequency $\nu$ and said microwave frequencies $f_1$ and $f_n$, and means at a plurality of points spaced transversely in the path of said beam after passing through said material for detecting variations in said optical beam at a frequency $um$ where $u$ is any integer.

10. An optical communications system comprising, a source of a beam of energy of optical frequency $\nu$ and wavelength $\lambda_\nu$ that is modulated by intelligence bearing signals of microwave frequency $f$, a body of material that is both piezoelectric and piezo-optic interposed in the path of said beam, means for applying to said body the electric field of a signal of microwave frequency $f+m$ where $m$ is an amount that is small compared to both of said optical frequency $\nu$ and said microwave frequency $f$, and means at a point in the path of said beam after passing through said material that is displaced by an angle $\theta$ from the path of said beam entering said material for detecting variations in said optical beam at said frequency $2m$ where $$\sin\frac{\theta}{2}=\frac{\lambda_\nu}{2\lambda_{(f+m)}}$$

11. An optical communications system comprising, a source of a beam of energy in the optical frequency range that is modulated by a band of intelligence bearing signals in the microwave frequency range, means for utilizing a portion only of said band of intelligence bearing signals, a body of material that is both piezoelectric and piezo-optic interposed in the path of said beam, means for applying to said body the electric field of a signal of microwave frequency separated by a given amount in frequency from said portion of said intelligence bearing signals, and means at a displaced point in the path of said beam after traversing said material for detecting variations in said beam in a band equivalent to said portion and including a frequency equal to a multiple of said given amount, and means for applying said detected variations to said utilizing means.

12. An optical communications system comprising, a source of a beam of energy in the optical frequency band that is modulated by a plurality of intelligence bearing signals in the microwave frequency band, a body of material that is both piezoelectric and piezo-optic interposed in the path of said beam, means for applying to said body the electric fields of a plurality of signals of microwave frequency separated respectively in frequency from each of said intelligence bearing signals, and means at a plurality of points spaced traversely in the path of said beam after passing through said material for detecting variations in said optical beam at the frequency of modulation products between said signals of microwave frequency.

References Cited

UNITED STATES PATENTS

| | | | |
|---|---|---|---|
| 2,557,974 | 6/1951 | Kibler | 250—199 |
| 3,020,398 | 2/1962 | Hyde | 250—199 X |
| 3,297,876 | 1/1967 | De Maria | 250—199 |

OTHER REFERENCES

S. Seito: Electronics, The Versatile Point Contact Diode, January 1963, pp. 82–85, Class 250, Subclass 199.

ROBERT L. GRIFFIN, *Primary Examiner.*

ALBERT J. MAYER, *Assistant Examiner.*

U.S. Cl. X.R.

329—144; 332—7.51; 350—169